July 7, 1970  L. J. ROBBINS  3,518,844
FLEXIBLE SHAFT

Filed Aug. 19, 1968  3 Sheets-Sheet 1

INVENTOR.
LAWRENCE J. ROBBINS
BY
Caesar, Rivise,
Bernstein & Cohen
ATTORNEYS.

July 7, 1970  L. J. ROBBINS  3,518,844
FLEXIBLE SHAFT
Filed Aug. 19, 1968  3 Sheets-Sheet 2
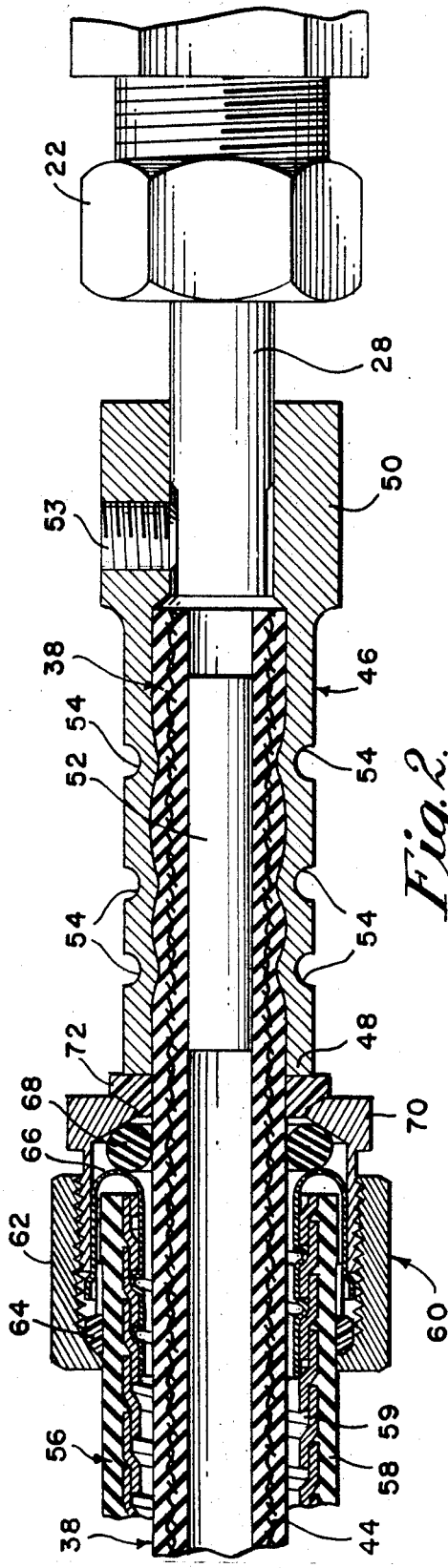
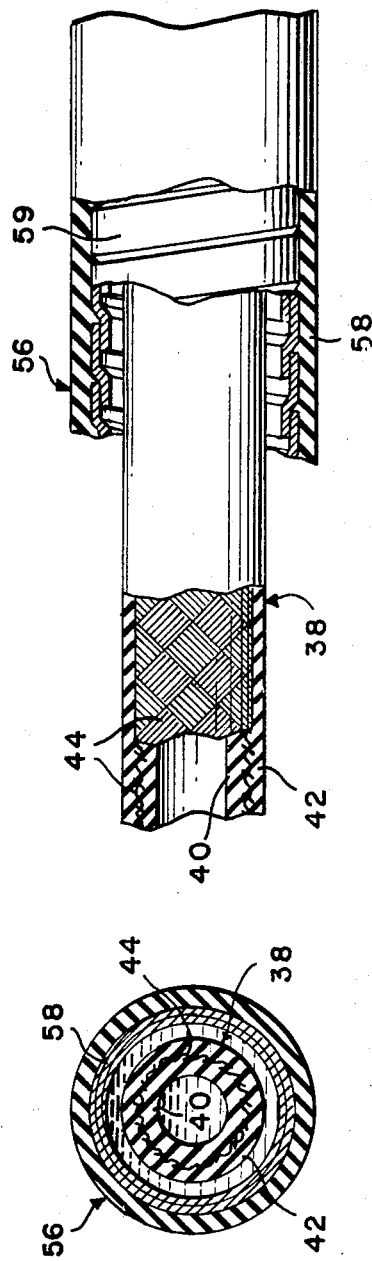
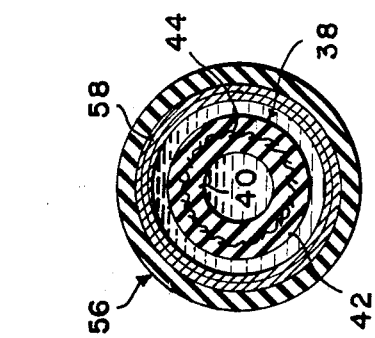
INVENTOR.
LAWRENCE J. ROBBINS
BY
Caesar, Rivise,
Bernstein & Cohen
ATTORNEYS.

July 7, 1970  L. J. ROBBINS  3,518,844
FLEXIBLE SHAFT

Filed Aug. 19, 1968  3 Sheets-Sheet 3

INVENTOR.
LAWRENCE J. ROBBINS
BY
Caesar, Rivise,
Bernstein & Cohen
ATTORNEYS.

United States Patent Office 3,518,844
Patented July 7, 1970

3,518,844
FLEXIBLE SHAFT
Lawrence J. Robbins, Collegeville, Pa., assignor to Flexadyne Corporation, Lansdale, Pa., a corporation of Pennsylvania
Filed Aug. 19, 1968, Ser. No. 753,348
Int. Cl. F16c *1/06, 1/26*
U.S. Cl. 64—4
6 Claims

ABSTRACT OF THE DISCLOSURE

A flexible shaft for linking rotatable members so that rotation of one rotatable member causes rotation of the other rotatable member. The shaft comprises an elongated core member which is connected between the rotatable members. The core member is substantially rigid torsionally and longitudinally flexible. An elongated sleeve is telescoped over the core member and is substantially co-extensive with the core member. The sleeve is longitudinally flexible and maintains a uniform inner diameter along the length of the sleeve. The inner diameter of the sleeve is substantially unchanged whether the sleeve is straight or curved. A lubricant is provided between the sleeve and the core member to facilitate movement of the core member with respect to the sleeve.

---

There are many applications in which flexible shafts are desirable in order to link distant rotatable members. For example, where valves are not easily accessible, it is desirable to be able to provide a flexible shaft which links the valve wheel with the valve. However, heretofore existing flexible shafts cannot enable access of a control wheel to a valve which is placed in very close and crowded environments. For example, in industrial machinery where fluid valves are required, the only means of controlling these valves are by electrically or pneumatically controlled valves. However, should there be a breakdown in either the electrical or pneumatic controls or the circuitry thereof, there is no manual safeguard available to shut off the normally open valves or open the normally closed valves in that the shafts heretofore known have not been sufficiently flexible to obtain access to the valves from outside the machinery. That is, heretofore available shafts have not been sufficiently flexible to enable access where more than a slight bend is required. Flexible shafts that have had the necessary flexibilty have been inadequate in that the shaft cannot be stationarily mounted during rotation thereof.

It is therefore an object of the invention to provide a new and improved flexible shaft which overcomes the aforementioned disadvantages.

Another object of the invention is to provide a new and improved flexible shaft which enables remote control of valves by manual means.

Another object of the invention is to provide a new and improved flexible shaft for linking rotatable members which may be utilized to link rotatable members that are separated by a large distance.

Another object of the invention is to provide a new and improved flexible shaft which utilizes an inner core for connecting two rotatable members and a protective flexible sleeve which is sealed to prevent contaminants from destroying the core.

Yet another object of the invention is to provide a new and improved flexible shaft which utilizes a lubricant between a core member and a co-extensive flexible sleeve to enable rotation of the core within the flexible sleeve.

Yet another object of the invention is to provide a new and improved flexible shaft for linking rotatable members which includes a sleeve which facilitates permanent securement of the shaft yet which enables rotation of an inner core therein.

These and other objects of the invention are achieved by providing a flexible shaft for linking rotatable members so that rotation of one of said rotatable members causes rotation of the other of said rotatable members. The shaft comprises an elongated core member which is connected between the rotatable members. The core member is substantially rigid torsionally and longitudinally flexible. An elongated sleeve is provided which is telescoped over the core member. The sleeve is substantially co-extensive with the core member and is longitudinally flexible yet maintains a uniform inner diameter along the length of the sleeve. The diameter is substantially unchanged whether the sleeve is straight or curved. A lubricant is also provided between the sleeve and the core member to facilitate movement of the core member with respect to the sleeve.

Other objects and many of the attendant advantages of this invention will be readily appreciated as the same becomes better understood by reference to the following detailed description when considered in connection with the accompanying drawings wherein:

FIG. 2 is an enlarged sectional view taken along the line 2—2 in FIG. 1;

FIG. 3 is an enlarged sectional view taken along the line 3—3 in FIG. 1;

FIG. 4 is a side elevational view with parts removed to show the construction of the flexible shaft;

Figure 1:
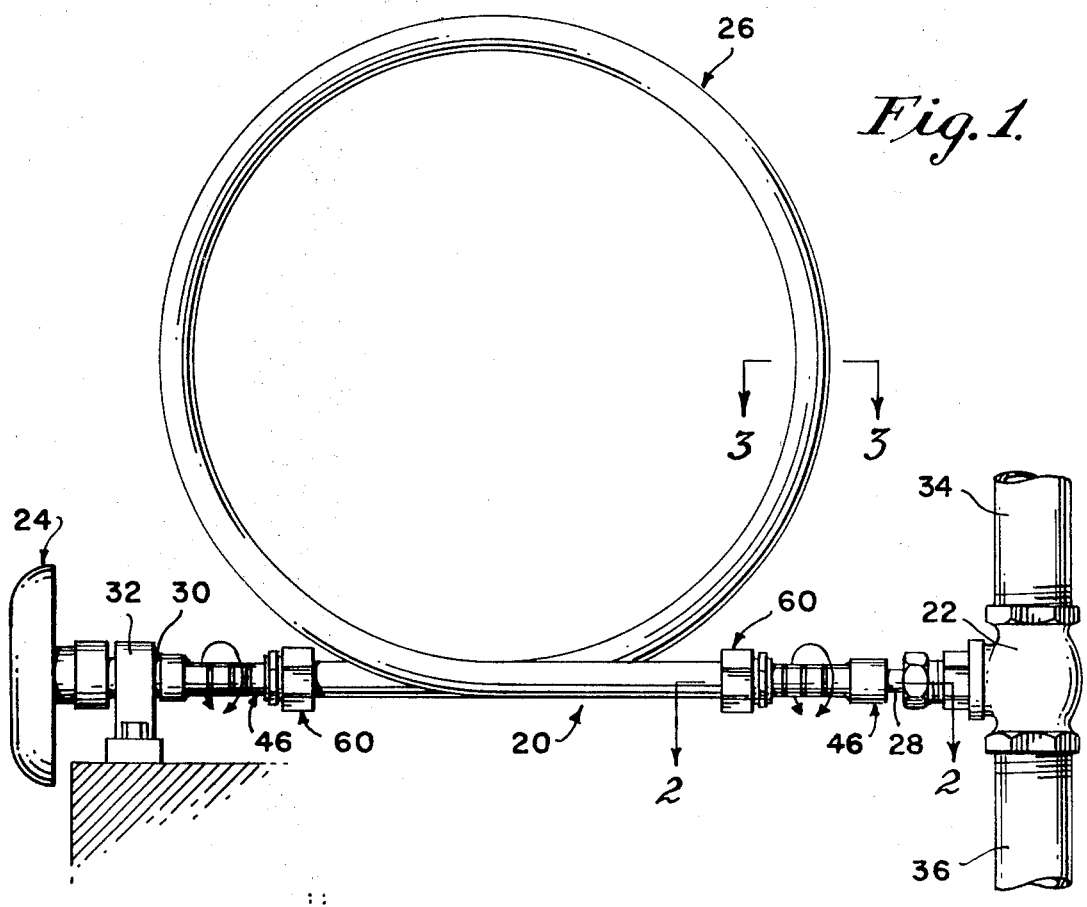
FIG. 1 is a side elevational view of a remote control valve embodying the invention.

Referring now in greater detail to the various figures of the drawing wherein similar reference characters refer to similar parts, a remote controlled valve assembly embodying the invention is shown generally at 20 in FIG. 1. The assembly 20 basically comprises a manually actuable valve 22 which is connected to a valve wheel 24 via a flexible shaft 26. The valve 22 is a conventional valve which is opened and closed by suitable rotation of the valve stem 28. The valve stem 28 is secured to the flexible shaft 26 which is in turn connected to the stem 20 of wheel 24. Wheel 24 is rotatably mounted in a bearing bracket 32 which supports the rail. Valve 22 controls the flow of fluid through pipes 34 and 36 in accordance with the opening provided in the valve by rotation of the valve wheel 24.

As best seen in FIGS. 2 and 4, flexible shaft 26 includes an elongated inner core 38. The inner core 38 comprises an hydraulic tube comprised of an inner tube 40 and a rubber outer tube 42, which are preferably comprised of neoprene rubber, which are bonded together about a high tensile wire braid 44. The external surfaces of the inner tube and outer tube 40 and 42 are preferably coated with an oil resistant material.

On each end of the core 38, there are provided end pieces 46. Each end piece 46 is generally cylindrical and includes a body portion 48 and an enlarged end portion 50. The body portion 48 includes an elongated bore which is of a slightly larger diameter than core 38 to receive the core. A cylindrical pin 52 is inserted within the bore of core 38 within the portion inserted into the body portion 48 of end piece 46.

The body portion 48 is crimped at points 54 about the core to secure the core within the end piece. Pin 52 prevents the core 38 from collapsing at points of crimping 54 and also seals the bore of the core when a viscous fluid is provided therein. As best seen in FIG. 2, the core 38 is secured between the crimped portions 54 and the pin 52 to prevent removal of the core from the end piece.

The enlarged portion 50 of each of the end pieces 48 also includes a longitudinally extending bore extending therethrough for reception of valve stem 28 and/or wheel stem 30. A radially extending threaded opening is provided in the end portion 50 to receive a suitable threaded fastener 53 which is utilized to secure the valve stem 28 to the end piece 46. As best seen in FIG. 2, the fastener 53 extends through the end piece 46 and bears against the surface of the valve stem 28 to fixedly secure the same within the end piece.

As set forth above, each of the end pieces 46 are similar so that one of the end pieces connected to core 38 is secured to the valve stem 28 and the other end piece 46, connected to the other end of core 38, is secured to the stem of wheel 30 in a similar manner.

Telescoped about the core 38 is an outer sleeve 56 which is preferably comprised of an electrical wire conduit having a neoprene rubber coating 58 bonded to the conduit coil 59.

Both the core 38 and the sleeve 56 are longitudinally flexible. The core 38, though longitudinally flexible, is torsionally rigid. Thus, if one end is rotated 90°, the other end will also be rotated 90° irrespective of the geometric configuration of the core. That is, whether the core be straight or in a loop as shown in FIG. 1 or in any other curved configuration, both ends will rotate equally provided that the torsional strength of the cable is not exceeded. The torsional rigidity of the core is further enhanced by providing a viscous fluid, such as hydraulic fluid, in the bore of the core. However, such fluid is optional.

The sleeve 56, though longitudinally flexible, maintains a uniform inner diameter throughout its length whether it is in a curved or straight configuration. Thus, the core 38 is rotatable within sleeve 56. A sealing member 60 is provided on each end of the sleeve 56.

Figures 6, 7:
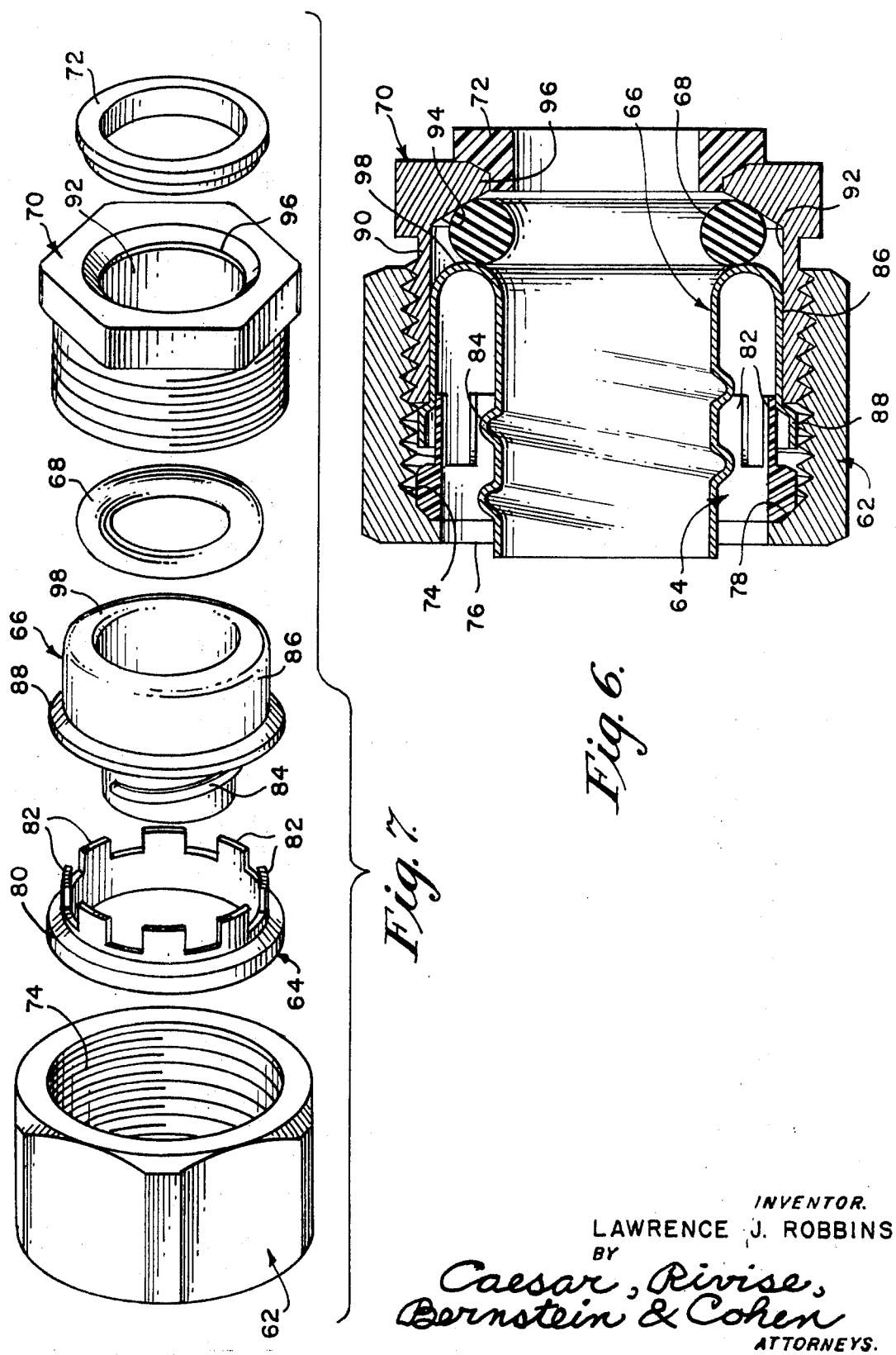
FIG. 6 is an enlarged elevational view of the sealing member provided at each end of the outer sleeve.
FIG. 7 is an exploded perspective view of the sealing member.

As best seen in FIGS. 6 and 7, each of the sealing members 60 basically comprises an external nut 62, a nylon lock ring 64, a sleeve end piece 66, an O-ring 68, an internal nut 70 and a compressed nylon bushing 72. The external nut 62 has an internally threaded longitudinally extending bore 74 which is connected to a circular opening 76. The bore 74 is tapered adjacent the opening 76 which forms an annular shoulder 78.

The lock ring 64 basically comprises an annular body 80 having a plurality of laterally projecting legs 82. As will hereinafter be seen, these legs lock the sleeve within the sealing member 60.

End piece 66 includes a cylindrical body portion 82 which is threaded at 84 and an annular U-shaped flange 86 which forms an annular receptacle for the end of the sleeve. The flange 86 is flared at its outermost portion 88 which acts to facilitate reception of the legs 82 of the lock ring 64.

O-ring 68 has a circular cross-section. The inner diameter of the O-ring is slightly larger than the outside diameter of the core so that the core may rotate with respect to the O-ring.

The internal nut 70 includes a cylindrical portion 90 which is threaded on its external surface and which includes a longitudinally extending bore 92. The bore 92 is tapered at the end thereof to form a shoulder 94. The compressed nylon bushing 72 is generally cylindrical and includes a reduced portion 96 which fits into the endmost opening of bore 92 of the internal nut 70.

As best seen in FIGS. 1 and 6, a sealing member 60 is secured at each end of the sleeve 56. In order to secure the sealing member to the end of the sleeve, the external nut 62 is telescoped over the end of the sleeve. The lock ring 64 is then placed with the annular body 80 placed against the shoulder 78 of the external nut. The end piece for the sleeve 66 is then screwed onto the end of the sleeve as the threads 84 engage the groove in conduit coil 59.

The O-ring 68 is placed against shoulder 94 of the internal nut 70 with pressed nylon bushing 72 having its reduced portion 96 inserted in the bore 92 of the nut as shown in FIG. 6. The internal nut is then telescoped over the core 38 and the internal nut screwed into the external nut 62. As the external and internal nuts are screwed together, the shoulder 78 urges the lock ring 64 against the flange 86 of the end piece 66. As the securement between the external and internal nuts becomes tighter, the lock ring becomes more and more tightly urged against the sleeve by the flared portion 88 of the flange 86. The edge 98 of the end piece urges the O-ring 68 against shoulder 94 thereby causing slight deformation thereof which provides a seal between the core and the O-ring. The O-ring and the core are still rotatable with respect to each other since the O-ring cannot be deformed to a large extent since the movement of the end piece 66 towards shoulder 94 is limited by the abutment of flared portion 88 of flange 86 against the edge of cylindrical portion 90 of nut 70.

After the sealing members 60 have been placed on each end of the sleeve, the end pieces 46 are placed on the core 38 and are pressed against the bushings 96 as they are secured to the ends of the core as best seen in FIG. 2. The nylon bushing and the O-ring thereby cause a tight seal to prevent contaminants from entering into the system between the sleeve and the core to prevent contamination of the core. Also, a lubricant which is provided between the sleeve and the core member is sealed within by the sealing members to prevent loss of lubricant.

The end pieces 46 are then utilized to secure the flexible shaft to rotatable members for linking the same for rotation together.

The sleeve 56 prevents lateral movement of the core when the core is rotating within the sleeve. Moreover, the sleeve enables securement of the flexible shaft to prevent movement of the same within a tight system.

It should therefore be noted that the flexible shaft embodying the invention enables provision of manual control of valves from remote positions even in tightly packaged industrial systems. That is, the radius of curvature of the sleeve and the core 38 are such that the valve may be controlled even though it is in an inaccessible position in that the shaft 26 may be bent about objects that would otherwise impede a straight shaft.

Figure 5:
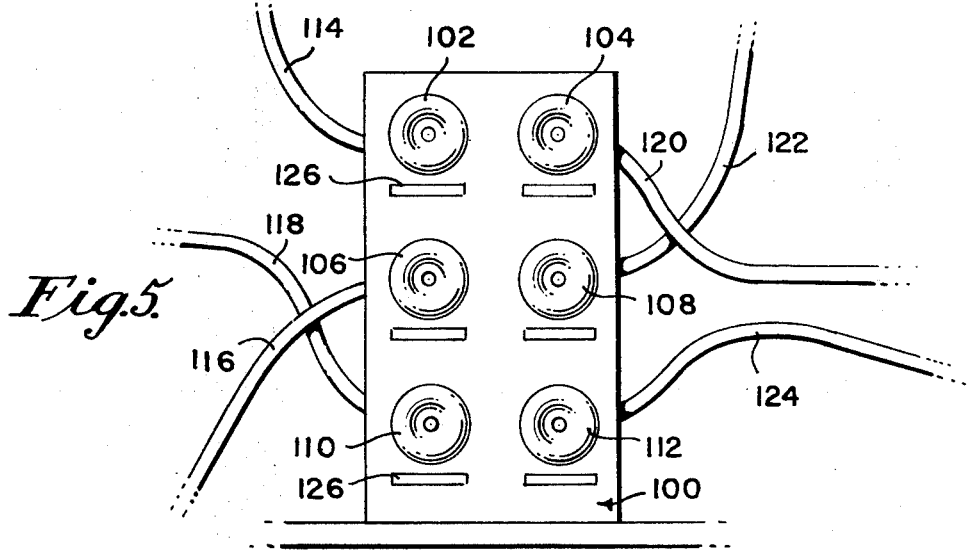
FIG. 5 is a side elevational view of a control panel utilizing a plurality of flexible shafts embodying the invention.

Thus, a plurality of valves provided throughout a system may be controlled from a single position. As best seen in FIG. 5, a console 100 is provided having a plurality of wheels 102, 104, 106, 108, 110 and 112 mounted thereon which are connected via flexible shafts 114, 116, 118, 120, 122 and 124, respectively, to various manually controlled valves. Name plates 126 are also provided to identify the valves to which the wheels are connected. Therefore, the flexible shafts embodying the invention enable consolidation of manual controls as well as facilitating control of valves that are provided in inaccessible positions.

It should be noted that in actual practice, flexible shafts embodying the invention have enabled the remote control of valves from a distance of one hundred feet. The cores have substantially no spring-back. That is, when one end of the core is turned 90°, the other end of the core also rotates 90°. Therefore, unless the torsional strength of the core is exceeded, there is substantially no variation in the amount of rotation at each end of the core.

Without further elaboration, the foregoing will so fully illustrate my invention that others may, by applying current or future knowledge, readily adapt the same for use under various conditions of service.

What is claimed as the invention is:

1. A flexible shaft for linking rotatable members so that rotation of one of said rotatable members causes rotation of the other of said rotatable members, said shaft comprising an elongated tubular core member connected between said rotatable members, said core member being substantially rigid torsionally and longitudinally flexible and an elongated sleeve telescoped over said core member, said sleeve being substantially co-extensive with said core member and being longitudinally flexible and having a uniform inner diameter along the length of the sleeve, said diameter being substantially unchanged whether said sleeve is straight or curved, a lubricant provided between the sleeve and the core member to facilitate rotation of the core member with respect to the sleeve, and an end piece secured at each end of said core member, said end piece comprising a tubular portion which is telescoped over the end of said core member, a pin being inserted in the bore of said core and within the bore of said end piece, said end piece being crimped to said core, said pin preventing the collapse of said core at said crimped portion to secure the end piece to said core.

2. A flexible shaft for linking rotatable members so that rotation of one of said rotatable members causes rotation of the other of said rotatable members, said shaft comprising an elongated core member connected between said rotatable members, said core member being substantially rigid torsionally and longitudinally flexible and an elongated sleeve telescoped over said core member, said sleeve being substantialy co-extensive with said core member and being longitudinally flexible and having a uniform inner diameter along the length of the sleeve, said diameter being substantially unchanged whether said sleeve is straight or curved, a lubricant provided between the sleeve and the core member to facilitate rotation of the core member with respect to the sleeve, a sealing member provided at each end of said sleeve to prevent contaminants from contaminating said core and for preventing the loss of lubricant between said sleeve and said core, said core including a pair of end pieces each being secured to a different end of said core, said end pieces being secured adjacent said sealing members to facilitate sealing of said core member, and a nylon bushing provided between each of said sealing members and said end pieces to facilitate rotation of said core member with respect to said sleeve.

3. A flexible shaft for linking rotatable members so that rotation of one of said rotatable members causes rotation of the other of said rotatable members, said shaft comprising an elongated core member connected between said rotatable members, said core member being substantially rigid torsionally and longitudinally flexible and an elongated sleeve telescoped over said core member, said sleeve being substantially co-extensive with said core member and being longitudinally flexible and having a uniform inner diameter along the length of the sleeve, said diameter being substantially unchanged whether said sleeve is straight or curved, a lubricant provided between the sleeve and the core member to facilitate rotation of the core member with respect to the sleeve, a sealing member is provided at each end of said sleeve to prevent contaminants from contaminating said core and for preventing the loss of lubricant between said sleeve and said core, said sealing member including means for locking said sealing member to said sleeve and means for sealing said sleeve to said core.

4. The invention of claim 3 wherein said sealing member comprises an O-ring which is of a diameter slightly larger than said core member, said O-ring being deformed during securement of said sealing member to said sleeve to seal the area between said core and said sleeve.

5. A flexible shaft for linking rotatable members so that rotation of one of said rotatable members causes rotation of the other of said rotatable members, said shaft comprising an elongated core member connected between said rotatable members, said core member being substantially rigid torsionally and longitudinally flexible and comprising an inner tube and outer tube of neoprene rubber which are bonded together about a high tensile wire braid and an elongated sleeve telescoped over said core member, said sleeve being substantially co-extensive with said core member and being longitudinally flexible and having a uniform inner diameter along the length of the sleeve, said diameter being substantially unchanged whether said sleeve is straight or curved and a lubricant provided between the sleeve and the core member to facilitate rotation of the core member with respect to the sleeve.

6. A flexible shaft for linking rotatable members so that rotation of one of said rotatable members cause rotation of the other of said rotatable members, said shaft comprising an elongated tubular core member connected between said rotatable members, said core member being substantially rigid torsionally and longitudinally flexible and the bore thereof filled with a viscous fluid and an elongated sleeve telescoped over said core member, said sleeve being substantially co-extensive with said core member and being longitudinally flexible and having a uniform inner diameter along the length of the sleeve, said diameter being substantially unchanged whether said sleeve is straight or curved and a lubricant provided between the sleeve and the core member to facilitate rotation of the core member with respect to the sleeve.

References Cited

UNITED STATES PATENTS

| | | | |
|---|---|---|---|
| 1,322,979 | 11/1919 | Waite | 64—2 X |
| 1,324,787 | 12/1919 | Berge | 64—4 |
| 1,915,003 | 6/1933 | Rosner | 64—3 X |
| 1,943,980 | 1/1934 | Mall | 64—4 |
| 2,092,830 | 9/1937 | Brickman et al. | 64—2 X |
| 2,370,884 | 3/1945 | Smith | 64—4 X |
| 3,190,084 | 6/1965 | Moon et al. | 64—3 |

JAMES A. WONG, Primary Examiner